Nov. 25, 1969          R. P. MATTHEWS ET AL          3,480,921
                          PULSE RECORDING MEANS
Filed Oct. 7, 1964                                  2 Sheets-Sheet 1

INVENTORS:
Robert P. Matthews
Gustavus J. Simmons
Fred J. Wymer
BY

*Roland G. Anderson*

Attorney

United States Patent Office 3,480,921
Patented Nov. 25, 1969

3,480,921
PULSE RECORDING MEANS
Robert P. Matthews, Albuquerque, Gustavus J. Simmons, Cedar Crest, and Fred J. Wymer, Albuquerque, N. Mex., assignors, by mesne assignments, to the United States of America as represented by the United States Atomic Energy Commission
Filed Oct. 7, 1964, Ser. No. 402,371
Int. Cl. G11b 5/00
U.S. Cl. 340—174
10 Claims

ABSTRACT OF THE DISCLOSURE

A pulse amplitude recording device including a magnetic element having an original, stable direction of magnetization and a pulse conducting means overlying the magnetic element in a direction at an angle less than or greater than 90 degrees to said original direction for conveying a pulse at least partially across said element to provide a magnetic field in the plane of the element in a direction greater than 90 degrees from said original direction to reverse the magnetization of a portion of the element proportional to the pulse amplitude adjacent the pulse conducting means, and also including means for recording pulses of opposite polarity.

---

The present invention relates generally to recording apparatus, and more particularly to thin film devices wherein electrical pulses of various amplitudes and polarities may be measured and recorded.

Previous investigations have shown that thin magnetic films possess a stable state of magnetization in the plane of the film having the unique capability of being rapidly and completely switched from the stable state to another state by rotating or reversing the magnetic flux in the plane of the film.

In theory, thin magnetic films which have unidirectional magnetization and homogeneous anisotropy (uniaxial anisotropy) should exhibit a square hysteresis loop with only two stable states. However, it has been found that individual portions of these films may be switched from one stable state to another while the remaining portion of the film remains in the initial state. This unique mechanism provided by thin magnetic films is advantageous for recording electrical pulse amplitudes since the quantity of remanent flux switched or reversed is the analogue of the recording pulse amplitude or the flux reversing field amplitude. This reversing field, i.e., the magnetic field generated by the recording pulse applied in the plane of the film, may be effected by electrical pulses having pulse widths ranging from about one nanosecond ($10^{-9}$ of a second) to about one second.

Applicants found that by placing a conductor in a particular disposition across a surface of a thin magnetic film in a direction generally perpendicular to the direction of film magnetization and utilizing a high speed pulse on the conductor to switch or reverse the direction of the film flux, the reversed film flux may be substantially restricted to the portion of the film underlying the conductor. The length of the switched portion of the film may be measured to determine the amplitude of the high speed pulse since the quantity of the switched film flux in the plane of the film is proportional to the pulse amplitude.

Thin magnetic film pulse amplitude recording devices envisioned by the present invention are applicable to several uses. For example, these thin film recording devices may be used in high radiation environments and recovered and read after the radiation has decreased to a tolerable level. Or, if desired, the reading of the pulse amplitudes may be telemetered to a remote location.

An object of the present invention is to provide means for measuring pulse amplitudes and for producing analogue recordings thereof.

Another object of the present invention is to provide means for measuring and recording pulse amplitudes in the nanosecond range.

A further object of the present invention is to provide a thin magnetic film recorder capable of storing amplitude and polarity information relative to high speed electrical pulses.

A still further object of the present invention is to provide pulse amplitude recording means by which linear or nonlinear recording characteristics may be obtained.

Other and further objects of the invention will be obvious upon an understanding of the illustrative embodiments about to be desired, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
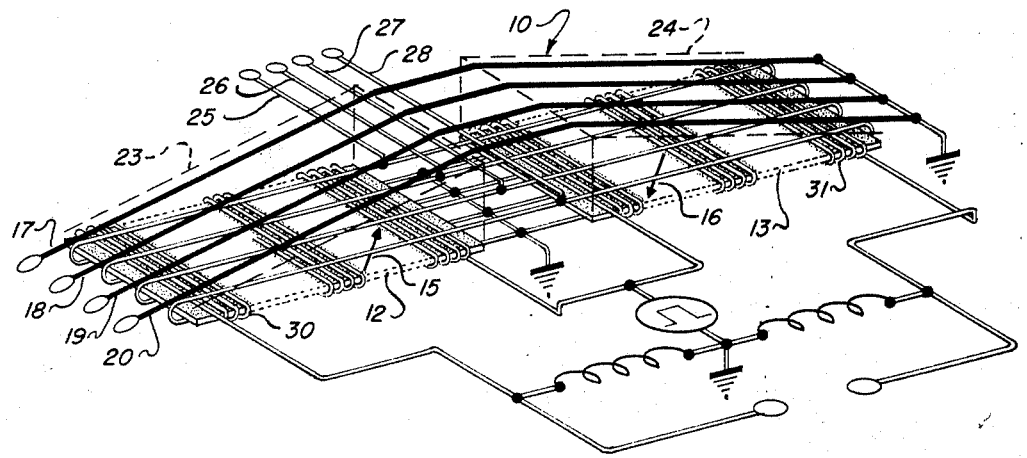
FIG. 1 is a generally schematic perspective view of a thin magnetic film device by which pulse amplitudes of both polarities may be recorded, interrogated and read.

Described generally, a thin magnetic film usable with the recording device of the present invention may comprise a thin layer of metal of about 1000 angstroms (A.) in thickness that has been evaporatively deposited upon the surface of a soft glass or quartz substrate maintained at elevated temperatures. During the deposition of the metal layer or film onto the substrate an externally oriented magnetic field is applied across the film in the plane thereof to magnetically orient the metal forming the film in the direction determined by the flux of the applied magnetic field. When the film and substrate are cooled and the magnetic field removed, the film will remain magnetized in the induced direction. This direction of film magnetization is referred to as the easy axis or the anisotropy axis while the axis in the plane of the film oriented 90 degrees from the easy axis is referred to as the hard axis. The application of a magnetic field in another direction, e.g., along the hard axis, does not permanently change the axis of the original magnetization since the magnetic particles of the film always return to their lowest energy state. The magnetic field used to orient the flux in the film during the formation of the film and subsequent cooling may be of about 50 to 100 or more oersteds (oe.).

The thin magnetic films may comprise any suitable metal or combination of metals deposited on a soft glass or quartz substrate. For example, the films may be made of a nickel-iron alloy comprising about 80% nickel and about 20% iron. These thin magnetic films may be of any suitable dimensions, for example, they may be about 1 inch wide, about 2.5 inches long, and about 1000 A. thick. The substrate for the films may be about 1 inch wide, about 3 inches long, and about 0.040 of an inch thick. The deposition of the film onto the substrate may be satisfactorily attained when the substrate is at a temperature of about 325° C.

While films and substrates of other dimensions may be satisfactorily used, care should be exercised to assure that the thin film contains sufficient surface area to adequately record the desired pulse amplitudes. Also, while the films are preferably of thicknesses of about 1000 A., they may be as thin as about 200 A. or as thick as about 2000 A. The thinner films switch faster while the thicker films provide better readout characteristics.

Preparation of the above thin films may be satisfactorily achieved by using a vapor source in an evacuated chamber under a vacuum of about $2 \times 10^{-5}$ millimeters of mercury. The vapor source may comprise a resistance heated, 0.125-inch-diameter tungsten rod with a small segment of the rod narrowed and flattened to about 0.060 of an inch so that evaporation of the film metal may take place from a small area. The source charge material or the film metal may comprise, for example, eight 0.005-inch-diameter nickel wires and two 0.005-inch-diameter iron wires twisted together and suspended above the tungsten rod on a suitable moving mechanism. This combined wire charge may then be fed onto the small area of the hot tungsten rod at a desired rate. This procedure provides for rapid evaporation of the nickel and iron so that a proper ratio of nickel to iron is obtained on a heated substrate in the form of a uniform metal coating.

The coercive field for the film, i.e., the reversing magnetic field which has to be applied in the easy direction in order to reduce the average film magnetization to zero, may usually be between about 2.5 oe. to about 3.0 oe. The anisotropy field, i.e., the magnetic field which, when applied in either of the hard directions perpendicular to the easy axis, will rotate the film magnetization 90 degrees from the easy direction to hard direction, may be about 4.0 oe. to about 5.0 oe. Thus, in order to effect switching of the film magnetization from one stable state to another, a recording magnetic field exceeding the film switching threshold must be applied to the plane of the field.

If a magnetic field emanating from a pulse conveying conductor is applied in the plane of the film at an angle of 90 degrees to the easy axis, i.e., parallel to the hard axis, switching or reversing by coherent rotation will not occur since at less than about 90 degrees the magnetization returns to its initial direction along the easy axis when the field is removed. Also, when the switching magnetic field is applied in a direction parallel to the easy axis essentially no torque is exerted on the remanent film magnetization by the applied field to effect coherent rotation of the film magnetization. The application of the parallel field will, however, effect switching by domain wall motion which is substantially slower than switching by coherent rotation and is, therefore, impractical for nanosecond switching and recording purposes.

In order to overcome the above mentioned shortcomings in high speed film switching, several procedures may be utilized, such as, for example, a direct current bias field may be applied in either hard direction while the switching magnetic field is applied in the reverse easy direction. The bias field in the hard direction reduces the rotational coercive field and partially rotates the film magnetization to promote coherent rotation and acceptable switching characteristics. Another and more satisfactory procedure may be practiced by applying the switching field or film magnetization reversing field in the plane of the film at an angle between 90 degrees and 180 degrees to the direction of the original film magnetization. This latter procedure may be effected by applying the magnetic field used during the formation or disposition of the film at an angle other than perpendicular to the longer sides of the film and thereby orienting the film flux at an angle with respect to the sides of the film. Thus, with the easy axis so oriented, a recording pulse conductor or drive line overlying the film may be disposed generally parallel to the longer sides of the film to effect switching lengthwise along the film while at the same time enabling the switching field to be applied in the plane of the film at an angle of about 90 degrees to about 180 degrees with respect to the direction of the original film magnetization. This application of the film switching magnetic field provides a hard direction component to initiate rotation of the film flux and a easy direction component to complete the rotation or reversal of the film magnetization.

The thin magnetic films may be deposited on the substrates so that the film reversing field may be applied at any desirable angle to the film magnetization or the easy axis. For example, field pulses at angles of about 105 degrees to about 165 degrees have provided satisfactory film switching. However, with switching field to film magnetization angles close to 90 degrees the hard direction field component is much larger than the easy direction component and may increase the percentage of film magnetization that is rotated to provide a more completely switched film.

While heretofore and other places in the specification the reversal of the film magnetization is referred to as the reversal or switching of the magnetic flux in the film, it should be understood that this is merely a convenient way of referring to film magnetization reversal since the reversal is actually due to the rotation of elemental particles in the film that make-up magnetic domains.

In FIG. 1 there is shown a pulse amplitude and polarity linear recording device of the present invention. This recording device generally indicated at 10 may comprise a pair of thin magnetic films 12 and 13 of essentially equal film flux densities but of opposite magnetization as indicated by the arrows 15 16, respectively. These films may have dimensions and other characteristics similar to the thin films described above. The arrows 15 and 16 are oriented along the easy axis of each film and are shown skewed with respect to the film edges to enable the switching field to be applied in the plane of the film at an angle greater than 90 degrees from the easy axis direction.

The pulse conductors or pulse drive lines 17, 18, 19, and 20 which may be used to apply the switching magnetic field to the films are shown extending across the planar surface of both thin films such that each drive line is common to both films. These pulse drive lines may be oriented in common planes and be disposed substantially parallel to each other and to the side edges of the films. Each drive line may be in the form of a single round wire strand of about 0.003 of an inch in diameter, as shown, or be formed from a printed circuit arrangement with parallel conducting strips of about 0.020 to 0.040 of an inch wide. While FIG. 1 shows four drive lines extending across the films 12 and 13 it is to be understood that any desired number of drive lines may be used. The maximum number of drive lines for any particular film would, of course, depend upon the relationship of the surface area across the width of the film with respect to the portion of the film width switched by each pulse. Normally, the width of the film switched by the input pulse may be about 0.010 of an inch.

As shown in FIG. 1 the pulse drive lines are uniformly spaced or separated from the film surface such that the drive lines at the location intermediate the films are spaced the greatest distance from the film surface while the ends of the drive lines remote to this intermediate location may be disposed adjacent to or in an abutting relationship with the film surfaces. This separation between the conductor and the film is uniformly varied so that a constant amplitude current pulse on the drive line provides a magnetic field of uniformly diminishing amplitude lengthwise across the plane of the film until at some point along the film the amplitude of the magnetic field decreases to a level below the film switching threshold. Thus, at this point the reversing or switching of the film ceases. The spacing or separation of the drive line from the film (shown exaggerated in FIG. 1 for reasons of clarity) is not critical; for example, the maximum separation could be about 0.040 inch for the printed circuit drive system and 0.060 inch for the wire drive system. However, the separation between the film and the drive lines should be sufficient so that at some point across the length of the film, the film ceases to switch when subjected to the input pulse. The result of this spacing between the drive lines and the film is significant in that for the wire drive system, the switching field in the plane of the film is uniformly varied from one end of the film to the other by a factor of about 40 for a constant amplitude pulse applied to the drive line.

The separation between the magnetic film and the drive lines is also advantageous in that if the drive lines were oriented in a plane parallel to the plane of the film, the switching field amplitude would be essentially constant, i.e., it would not diminish sufficiently along the length of the above-mentioned films to complete a recording of the pulse amplitude. Of course, it may be feasible that a conductor or drive line disposed in a plane parallel to an infinitely long magnetic film may over a considerable length of the film diminish sufficiently to provide a pulse amplitude recording on the underlying magnetic film. However, such a construction is impractical, particularly since applicants found that by uniformly varying the separation of the drive line from the film they could sufficiently attenuate or decrease the pulse amplitude to provide the desired recording characteristics on a relatively short length of film. The separators or spacing members may be of any suitable material or construction, for example, they may comprise wedge shaped bodies 23 and 24 of a suitable plastic material such as resin or the like. Or, if desired, a framework (not shown) may be disposed between the films and the drive lines such that an air space provides the desired pulse field attenuation. The plastic body and the air space between the films and the drive lines provide similar recording characteristics since they are substantially equal in permeability to the passage of magnetic flux.

When a pulse having an amplitude greater than the switching threshold of the films 12 or 13 is introduced from a suitable source (not shown) into one of the pulse drive lines, a film switching magnetic field is generated in a direction in the plane of the film determined by the polarity of the pulse. If this pulse is of negative polarity its passage over film 13 is such that the magnetic field emitting therefrom does not switch the underlying film but, in effect, reinforces it since the field emanating from the drive line is oriented in the same direction as the original film magnetization.

However, as this pulse of the same negative polarity passes over the film 12, its film switching magnetic field is oriented in a direction between 90 degrees to about 180 degrees away from the direction of original magnetization as to effect switching of a length of the underlying film 12. Conversely, if another drive line is subjected to a positive polarity pulse, the recording of the pulse amplitude will be made on film 13 rather than film 12.

In order to provide read out for the various pulse recordings on the films 12 and 13 it may be desirable to use a nondestructive, analogue, electrical read out system. This system may comprise the positioning of interrogate lines 25, 26, 27, and 28 under the recording lines 17 through 20 respectively, and in a plane parallel to and in close proximity to the plane of the films. These interrogate lines may each extend across both films as to be coextensive with the drive lines with respect to the film lengths. The interrogate lines may comprise lengths of wire having dimensions similar to the wires used in the pulse drive lines. When it is desired to read the recorded pulse amplitude on either of the films 12 or 13 under a particular pulse drive line, a pulse may be applied to the interrogate line underlying the particular drive line. These interrogate pulses, which may be obtained from a suitable pulse generating device such as a capacitor or the like (not shown), may be applied to the interrogate line from either hard direction and be provided with an amplitude less than the film switching threshold so that film switching will not occur. The result of using pulses of less than switching amplitudes along the interrogate line is that the film magnetization is slightly rotated off the easy axis by the interrogate pulse such that upon removal of the interrogate field the film magnetization returns to its original or switched position, i.e., the orientation of the film flux immediately prior to the interrogate pulse. Because the magnetization of the film is constant, the partial rotation by the interrogate field results in a change in the flux along the easy axis. Thus, a pickup coil may be used to measure the easy axis flux change so that when the interrogate field pulse is applied, a flux change along the easy axis is observed, the polarity of which is determined by the magnetization state of the film. The net amount of easy axis flux change is determined by the net film flux and the interrogate field amplitude and its rise time.

Inasmuch as each interrogate wire in FIG. 1 links films 12 and 13 of opposite magnetization, each film may be provided with a single pickup coil 30 and 31 so that a read out pulse on an unswitched film may be of an equal amplitude and opposite polarity to the read out pulse on the other unswitched film. Thus, if these pickup coils 30 and 31 were connected in series to provide a coil common to both films, then the net pulse output on the coil for unswitched films would be zero.

The difference between the film magnetization oriented in one easy direction and that of the film magnetization oriented in another easy direction determines the pulse amplitude. Thus, if a pulse is applied to one of the drive lines in the FIG. 1 device one or the other of the two films will switch and record the pulse amplitude depending upon a polarity of the recording pulse. This switching of a portion of one film will change the net magnetization of the two films towards a complete magnetization reversal in the recording area of one or the other film. Thus, during interrogation a net flux will be detected by the pickup coil and the readout pulse will provide the amplitude of the input pulse as well as its polarity. Both the recording on the film and the read out on the coil are proportional to or the analogue of the recording pulse amplitude. If the pickup coil is wound with uniformly spaced apart turns about each film 12 and 13, the read out amplitude should be linear with both the flux switched and the recording pulse amplitude.

The pickup coils 30 and 31 may each comprise about 400 turns of wire having a diameter of about 33 AWG and loaded with, that is, incorporates a resistance of about 1000 ohms. The output of these coils may be displayed on a suitable device such as an oscilloscope or the like (not shown) or telemetered to a remote display (not shown).

The pickup coils disposed about the films provide another advantageous feature in that they may be used to "clear" the switched portions of the film, i.e., reswitch the switched magnetization to its direction of original magnetization. For example, a 400 turn pickup coil provided with a pulse of about 0.04 ampere may readily clear a switched film.

In a typical pulse recording operation using the wire drive lines of FIG. 1, a field pulse amplitude of about one nanosecond pulse width may be applied to the plane of the films 12 or 13 at an angle of about 105 degrees to the direction of original film magnetization. If this pulse has sufficient amplitude to switch 0.276, that is, about one-fourth of the film length, then the length of the switched film would correspond to an input pulse amplitude of about 70 oe. This same pulse amplitude applied to other magnetic films at angles of about 135 degrees and about 165 degrees to the direction of the original film magnetization may switch film length fractions of about 0.297 and 0.268, respectively.

While the FIG. 1 system utilizes a pair of recording films it will appear obvious that a single recording film may be used with the read out system.

Figure 2:
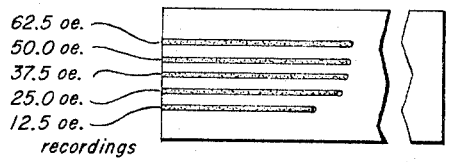
FIG. 2 is a plan view showing several pulse recordings of different amplitudes on a single magnetic film.
Figure 3:
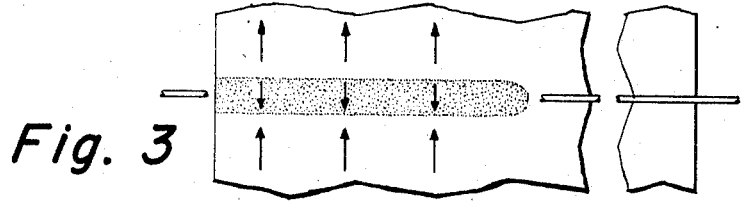
FIG. 3 is a fragmentary plan view of a thin magnetic film showing the relative orientation of the magnetization in the switched or reversed portion of the film with respect to the unswitched film magnetization in the remaining portion of the film.

In FIG. 2 there is shown a thin magnetic film with recordings of different input pulse amplitudes attained by using a multiple drive line configuration such as in FIG. 1. Each of these recording traces represent portions of the film in which the film magnetization has been rotated 180 degrees from its original magnetization direction as shown diagramatically in FIG. 3.

Figure 4:
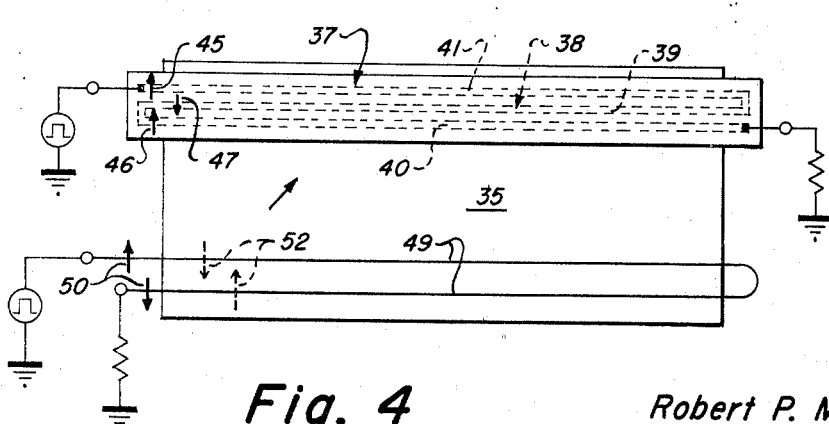
FIG. 4 is a plan view showing other forms of pulse amplitude recording devices.

FIG. 4 shows other embodiments of the present invention which may be used with a thin magnetic film 35 having about the same dimensions and of substantially the same material as the films 12 and 13 in FIG. 1. In this figure the printed circuit board pulse drive line shown at 37 may comprise a dielectric substrate with a continuous conducting strip 38 thereon of about 0.020 to about 0.040 of an inch wide. This conducting strip may be bent back upon itself or folded side-by-side on itself twice to provide a spaced apart parallel conductor arrangement defined by a center conductor 39 intermediate outside conductors 40 and 41. The small arrows 45 and 46 on the outside lines 40 and 41, respectively, are used to indicate the direction of the film switching field and are generally oriented in the direction of the original magnetization such that the magnetic fields from these outside lines are not capable of switching the film and are, therefore, referred to as "inhibit" lines. The center conductor 39, however, has the magnetic field emitting therefrom in reverse easy direction as indicated by the arrow 47 such that it provides switching of the magnetic film in a manner similar to the FIG. 1 device.

The advantage of placing the outside lines 40 and 41 on either side of the center line or "write" line 39 is that the switching of the film may be confined to a relatively small fraction of the film width due to the influence of the film flux reinforcing affect afforded by the magnetic fields from the inhibit lines 40 and 41. This narrow pulse recording minimizes the possibility of having the switching field subjected to anisotropic edge effects or other objectionable film characteristics.

Figure 5:
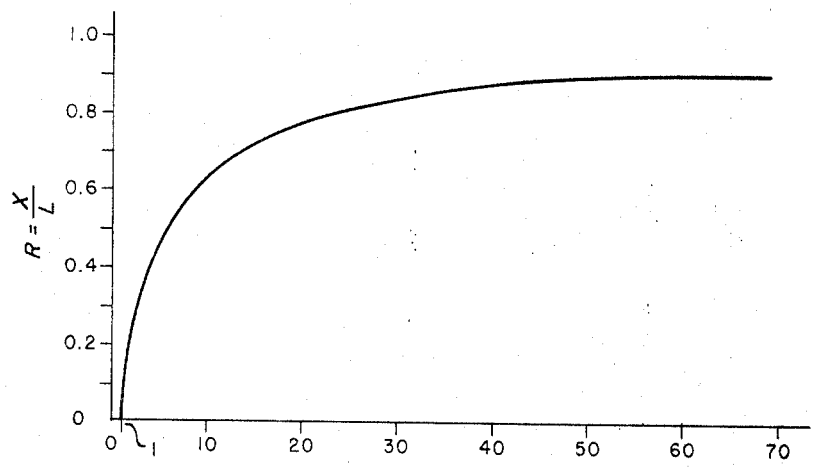
FIG. 5 is a graph illustrating non-linear or logarithmic recording characteristics.

The printed circuit drive line configuration shown in FIG. 4 provides a non-linear or logarithmic recording such as shown in FIG. 5. However, this recording may be made linear with a printed circuit drive by using a single conducting strip without the inhibit lines.

FIG. 4 also shows a wire pulse drive line which may be used for providing pulse amplitude recordings of either polarity on a single film. This wire 49 may be of any suitable conducting material of about 0.003 of an inch in diameter and folded back upon itself one time such that if an input pulse having its magnetic field oriented in the direction of the solid arrows 50 is applied to the wire the film switches at a location on the film underlying the portion of the wire having the solid arrow pointing away from the easy axis or the original direction of magnetization. Conversely, if a pulse of the opposite polarity is introduced into the drive line 49 the magnetic field indicated by the dotted arrows 52 will effect switching of the film under the other portion of the drive line since the dotted arrow thereon points in the direction away from the easy axis. This wire drive line arrangement may provide linear recordings of pulse amplitude as shown in FIG. 6.

Figure 6:
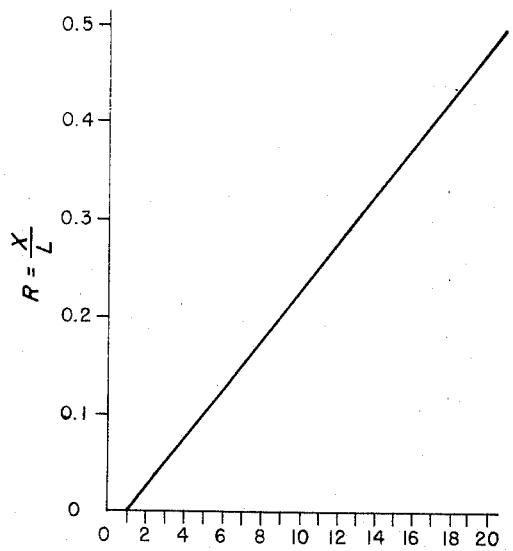
FIG. 6 is a graph illustrating linear recording characteristics.

The recordings in FIGS. 5 and 6 are theoretical curves of the fractional film length switched (R) verses the ratio of the applied field amplitude ($H_{TO}$) to the film switching threshold ($H_{TH}$).

The pulse recording device as shown in FIG. 1 provides linear pulse amplitude recordings since the spacing or separation between the films and the drive lines is uniformly varied. However, logarithmic pulse amplitude recordings may be attained by nonuniformly increasing the spacing between the films and drive lines, e.g., by initially orienting the drive lines at a slight angle with respect to the film surface and gradually increasing this angle as the drive lines cross the film. An antilogarithmic recording may be attained by initially orienting the drive lines at a relatively steep angle and then gradually decreasing the angle as the drive lines cross the film.

It will be seen that a pulse amplitude recorder constructed in accordance with the teachings of the present invention is capable of providing accurate measurements and storage of electrical pulses having pulse widths as narrow as one nanosecond. Also, the present invention provides for permanent storage of pulse amplitude recordings if such is desired. The pulse amplitude recorder is a simple, rugged and relatively inexpensive device capable of obtaining permanent recordings of extremely high speed pulses in intense radiation environments. Another feature of the present device is due to the advantage of changing "real time" for "telemetry time." In other words, with a pulse width of about one nanosecond it would require the use of a receiver of about a 5 kilomegacycle rating to receive the signal. However, by using applicants' thin magnetic film recorder with a read out circuit as disclosed herein, the pulse amplitude may be telemetered to a suitable display at a frequency of about 1 kilocycle.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A pulse amplitude recording device comprising a magnetic element having an original direction of magnetization in a stable state along the easy axis of magnetization of said element, and pulse conducting means overlying said element at an angle between 0 and 90 degrees to said easy axis for conveying a pulse at least partially across said element for providing a magnetic field in the plane of the element in a direction between 90 and 180 degrees away from said original direction for reversing the direction of magnetization in a portion of the element adjacent to the pulse conducting means while not effecting magnetization reversal in any other portion of the element.

2. The device claimed in claim 1 wherein the pulse conducting means comprises a printed circuit board having a continuous conducting strip defining a plurality of spaced apart parallel conducting paths, one of said conducting paths having said magnetic field emanating therefrom in said direction greater than 90 degrees away from said original direction while at least one other conducting path has the magnetic field emanating therefrom in a direction in the plane of the element of less than 90 degrees away from said original direction.

3. The device claimed in claim 1 wherein the pulse conducting means comprises a continuous substantially round wire folded back upon itself to provide a pair of parallel spaced apart conducting paths such that the pulse of a particular polarity reverses a portion of the magnetization of said element at a location thereon adjacent one of said conducting paths while a pulse of another polarity effects magnetization reversal in another portion of the element adjacent the other of said conducting paths.

4. The device claimed in claim 1 wherein said pulse conducting means is contiguous to a marginal portion of said element and laterally spaced from an oppositely disposed marginal portion of said element.

5. A pulse amplitude recording device comprising a thin film of magnetic material having an original direction of magnetization in the plane of the film along its axis easy an magnetization of said material in a stable orientation, a pulse conducting means overlying said film at an angle between 0 and 90 degrees to said axis for conveying a pulse at least partially across said film and imposing a magnetic field in the plane of the film to reverse the direction of the original film magnetization in a portion of said film when said magnetic field is oriented in the plane of the film at an angle of between about 90 degrees to about 180 degrees with respect to the direction of the original film magnetization, said pulse conducting means having a substantial portion thereof laterally spaced from said film with the spacing therebetween varying in increasing manner in one direction over the surface of said film.

6. The device claimed in claim 5 wherein the pulse conducting means is contiguous to a marginal surface portion of said film.

7. The device claimed in claim 5 wherein the space between said film and said pulse conducting means contains substances of essentially equal permeability to the passage of magnetic fields.

8. The device claimed in claim 5 wherein a plurality of pulse conducting means overlie said film in a common plane with each of said conducting means being spaced from and disposed parallel to each other.

9. The device claimed in claim 5 wherein a pickup coil comprising a plurality of substantially equally spaced apart turns of conducting wire encircles said film, a further conducting wire is disposed in a plane substantially parallel with the plane of the film at a location generally intermediate said film and said pulse conducting means and in close proximity to the surface of said film, and means for including a pulse in said further conducting wire to provide a magnetic field thereon that is of an amplitude insufficient to reverse said magnetization but of sufficient amplitude to partially rotate the reversed magnetization and thereby impose upon said coil a current indicative of the reversing pulse amplitude.

10. The device claimed in claim 5 wherein an other thin film of magnetic material is axially spaced from the first mentioned film, said other film has an original axis of magnetization along its easy axis of magnetization disposed in a direction of stable orientation similar to said first mentioned film but disposed about 180 degrees therefrom, said pulse conducting means overlies both of said films to facilitate the reversal of the magnetization in a portion of said other film when the magnetic field of said pulse conducting means is disposed in the plane of said other film at an angle of between about 90 degrees to about 180 degrees with respect to the direction of the original axis of magnetization of said other film, and said coil and said further conducting wire are common to both of said films.

References Cited
UNITED STATES PATENTS

| | | | |
|---|---|---|---|
| 3,140,471 | 7/1964 | Fuller | 340—174 |
| 3,206,736 | 9/1965 | Krylow et al. | 340—174 |
| 3,212,072 | 10/1965 | Fuller | 340—174 |
| 3,230,515 | 1/1966 | Smaller | 340—174 |
| 3,248,713 | 4/1966 | Middelhoek | 340—174 |

BERNARD KONICK, Primary Examiner

VINCENT P. CANNEY, Assistant Examiner